US007765169B2

(12) United States Patent
Pintsov et al.

(10) Patent No.: US 7,765,169 B2
(45) Date of Patent: Jul. 27, 2010

(54) SYSTEM AND METHOD FOR INTERNAL PROCESSING OF MAIL USING SENDER AND RECIPIENT NETWORKED MAIL PROCESSING SYSTEMS

(75) Inventors: Leon A. Pintsov, West Hartford, CT (US); Andrei Obrea, Seymour, CT (US)

(73) Assignee: Pitney Bowes Inc., Stamford, CT (US)

( * ) Notice: Subject to any disclaimer, the term of this patent is extended or adjusted under 35 U.S.C. 154(b) by 78 days.

(21) Appl. No.: 12/125,092

(22) Filed: May 22, 2008

(65) Prior Publication Data

US 2009/0288997 A1 Nov. 26, 2009

(51) Int. Cl.
*G06F 17/00* (2006.01)

(52) U.S. Cl. ...................................................... 705/406

(58) Field of Classification Search ......... 705/401–411, 705/60–62

See application file for complete search history.

(56) References Cited

U.S. PATENT DOCUMENTS 5,925,864 A 7/1999 Sansone et al.
6,006,211 A 12/1999 Sansone et al.
6,032,138 A 2/2000 McFiggans et al.
6,064,995 A 5/2000 Sansone et al.
6,508,365 B1 1/2003 Cacace-Bailey et al.
6,549,892 B1 * 4/2003 Sansone ..................... 705/401
6,740,835 B2 5/2004 Steinmetz et al.
6,954,742 B2 10/2005 Cordery et al.
6,988,021 B2 1/2006 Daniels, Jr. et al.
2002/0026430 A1 * 2/2002 Ryan, Jr. ..................... 705/404
2003/0110145 A1 * 6/2003 Sansone ..................... 705/406

OTHER PUBLICATIONS

XP-002137735, Information Based Indicia Program (IBIP) Indicium Specification, USPS, Jun. 13, 1996.

* cited by examiner

*Primary Examiner*—Igor Borissov
(74) *Attorney, Agent, or Firm*—Brian A. Lemm; Angelo N. Chaclas

(57) ABSTRACT

Systems and methods for authenticating the mailer of a mail piece in a manner that is trustworthy and not easily susceptible to fraudulent manipulation are provided. A mail processing system is utilized by recipients of mail pieces to scan each incoming mail piece. The mail processing system obtains information from the mail piece, which can include an identification of the postage meter that was used to generate the indicium. Based on the identification of the postage meter or other unique information, the recipient's mail processing system can obtain an identification of the mailer. Once the identification of the mailer is ascertained based on this information, the recipient can utilize one or more business rules for internal delivery of the mail piece.

18 Claims, 4 Drawing Sheets

SYSTEM AND METHOD FOR INTERNAL PROCESSING OF MAIL USING SENDER AND RECIPIENT NETWORKED MAIL PROCESSING SYSTEMS

FIELD OF THE INVENTION

The invention disclosed herein relates generally to the processing of mail, and more particularly to networked mail processing systems that operate to increase the efficiency and safety of mail delivery.

BACKGROUND OF THE INVENTION

Numerous postal systems have been developed around the world for the delivery of mail pieces, e.g., letters, flats, packages, and the like. In many situations, when a mail piece is received by a recipient entity, there is the need to authenticate the mailer (sender) of a given mail piece before opening it or taking some other action. This is especially true when the recipient entity is a business or other large entity where all incoming mail is processed in a central mail room for internal delivery throughout the entity. The authentication of the mailer is usually accomplished by examining the return address on the mail piece. This form of authentication, however, is not completely trustworthy as the return address on a mail piece can easily be manipulated or forged in order to deceive the recipient.

It would be desirable, therefore, to be able to positively authenticate the mailer of a mail piece in a manner that is trustworthy and not easily susceptible to fraudulent manipulation.

SUMMARY OF THE INVENTION

The present invention alleviates the problems associated with the prior art and provides systems and methods for authenticating the mailer of a mail piece in a manner that is trustworthy and not easily susceptible to fraudulent manipulation.

In accordance with the present invention, a mail processing system is utilized by recipients of mail pieces to scan each incoming mail piece. For those incoming mail pieces that are provided with a postage meter generated indicium that evidences payment of postage, the mail processing system obtains information from the indicium on each mail piece. Such information could include, for example, an identification of the postage meter that was used to generate the indicium. Based on the identification of the postage meter, the recipient's mail processing system can obtain an identification of the party to which the postage meter is registered for use. Once the identification of the mailer is ascertained based on this information, the recipient can utilize one or more business rules, based on the identification of the mailer, for internal delivery of the mail piece. Additionally, the recipient's mail processing system can provide notification to the sender's mail processing system of receipt of the mail piece.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PRESENT INVENTION

Figure 1:
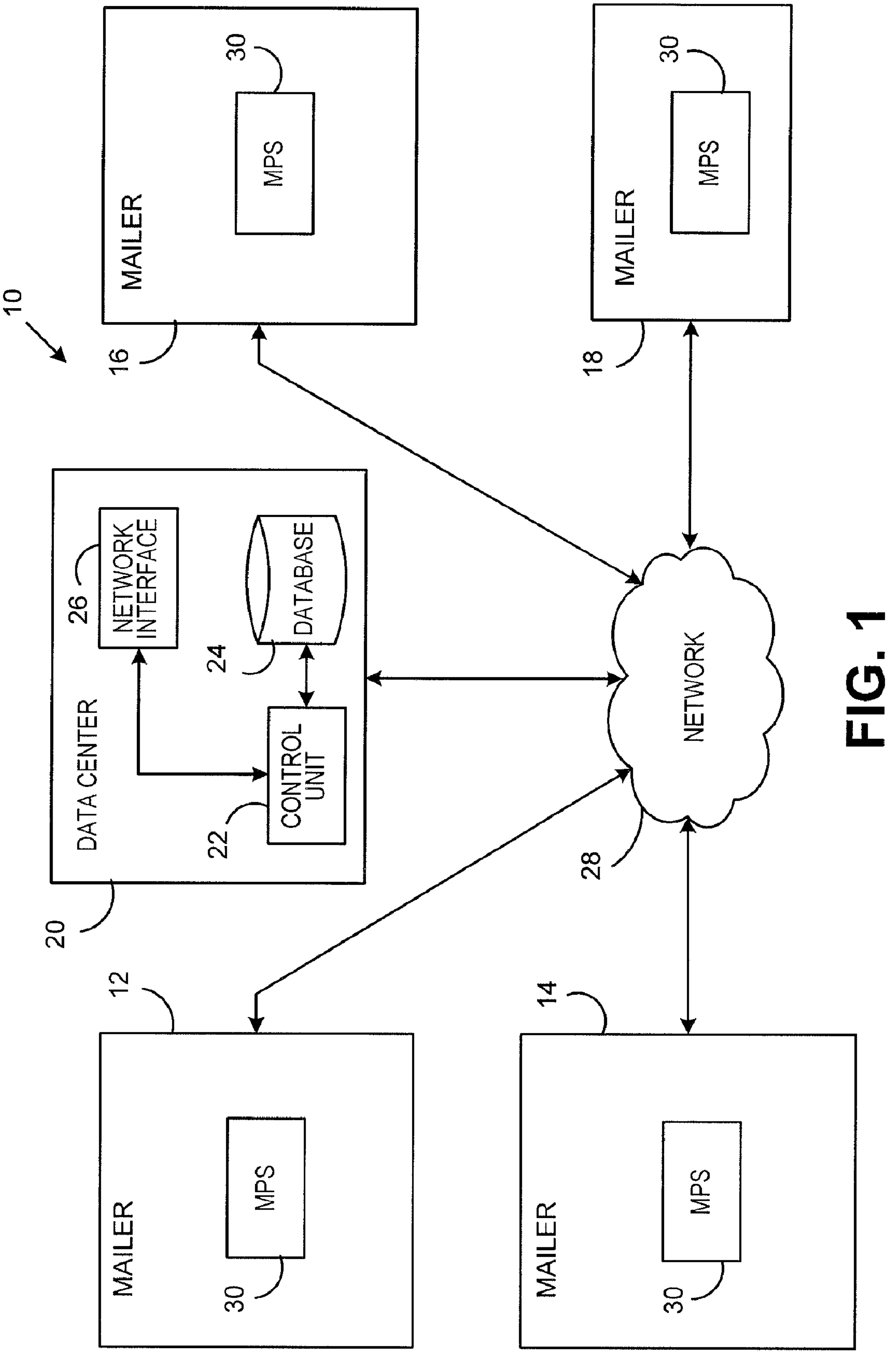
FIG. 1 illustrates a system according to an embodiment of the present invention.

In describing the present invention, reference is made to the drawings, wherein there is seen in FIG. 1 a system 10 according to an embodiment of the present invention. System 10 includes a plurality of mailers, e.g., mailer 12, mailer 14, mailer 16, mailer 18. Mailers 12-18 may be, for example, any type of business entity, corporation, organization, or the like that utilizes a mail processing system (MPS) 30 as described below. While only four mailers are illustrated in FIG. 1, it should be understood that any number of mailers may be part of the system 10. Each mailer 12-18 operates one or more mail processing systems (MPS) 30 (described further below with respect to FIG. 2) to process both outgoing and incoming mail.

Each of the mailers 12-18 is adapted to communicate with a data center 20. Such communications can be done utilizing any type of communication network 28, such as, for example, the Internet, a telephone network, or the like. Data center 20 preferably includes a control unit 22 and one or more databases 24, as will be described below. Control unit 22 can be, for example, a processing unit or the like that is adapted to control operation of the data center 20. Data center 20 includes a network interface 26 that provides the necessary communication hardware/software required for the data center 20 to communicate via the network 28 with the mail processing systems 30 operated by mailers 12-18.

Figure 2:
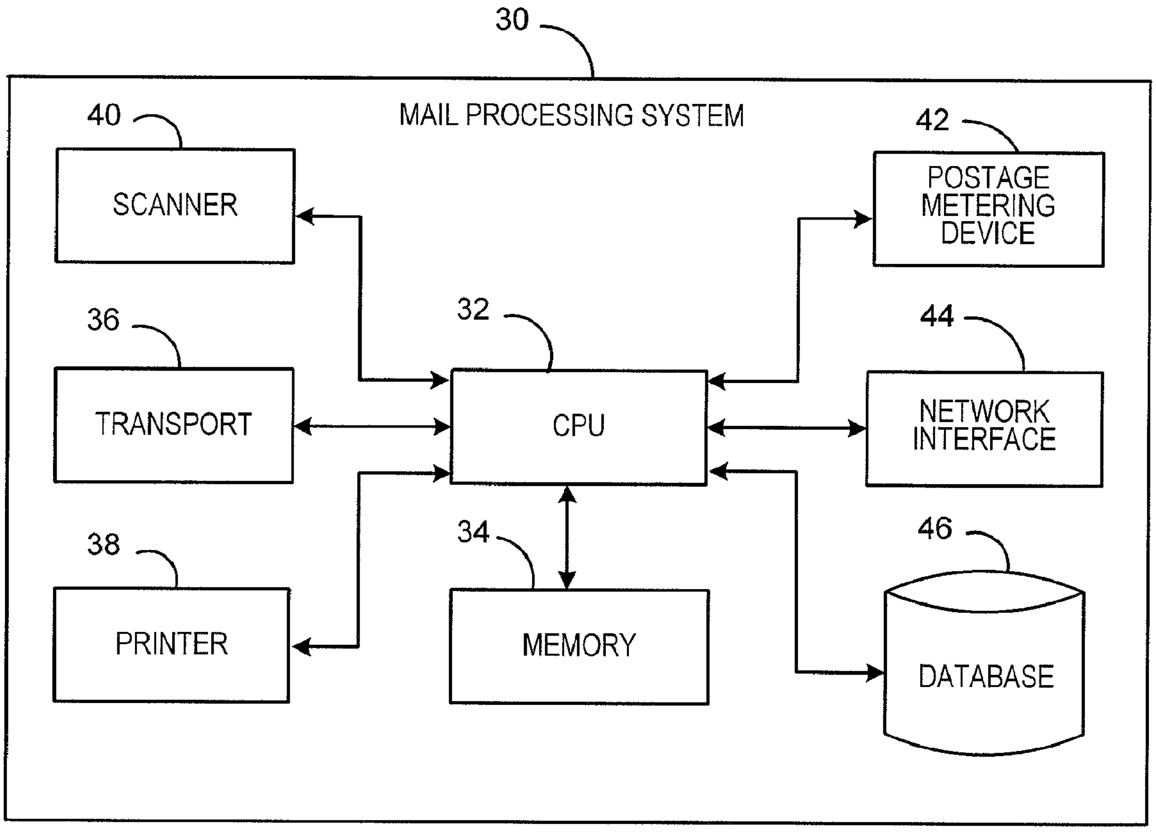
FIG. 2 illustrates an example of a mail processing system according to an embodiment of the present invention.

FIG. 2 illustrates in block diagram form a mail processing system 30 that can be utilized by each of the mailers 12-18 of FIG. 1. Each mail processing system 30 can be, for example, a dedicated mailing machine or any other type of device that is utilized to process outgoing mail pieces that is adapted (as described below) to also process incoming mail pieces. There are many different types of mailing machines, ranging from relatively small units that handle only one mail piece at a time, to large, multi-functional units that can process hundreds of mail pieces per hour in a continuous stream operation. MPS 30 includes a central processing unit 32, which can include, for example, one or more special or general purpose processing devices. The CPU 32 controls operation of the MPS 30 using instructions stored in one or more memory units 34. The MPS 30 preferably includes a transport 36, such as, for example, rollers and belts, that automate the processing of mail pieces by transporting the mail pieces through the MPS 30. Such transport systems are well known in the art.

When processing outgoing mail pieces, the CPU 32 communicates with a postage metering device 42 that is utilized to generate indicia to evidence payment of postage for mail pieces and provide accounting data for communication to the data center 20 via network interface 44. Postage metering device 42 is preferably a secure coprocessor that performs cryptographic operations and keeps track of funds by maintaining a descending register which stores an amount of funds available for use and an ascending register which stores a total amount of funds dispensed over the life of the metering device 42. Funds may be added to the descending register by any conventional means. A printer 38 is used to print information on the mail pieces, such as, for example, indicia generated by the postage metering device 42, address information (either or both of the sender and recipient), ad slogans, and the like. Printer 38 may be, for example, an ink jet printer or other conventional type of printing device. The MPS 30 is adapted to process incoming mail pieces by having a scanning or reading device 40 to scan information printed on the mail pieces that are received by the mailer. A network interface 44 provides the necessary communication hardware/software required for the MPS 30 to communicate via the network 28 with data center 20, and may also be used for communication directly with the MPS 30 of a different mailer via the network 28. MPS 30 also preferably includes a memory or database 46 that is utilized to store information, such as, for example, business rules for delivery of mail pieces, identification information, e.g., identification numbers for mail processing systems associated with specific senders, or the like as further described below.

Figure 3:
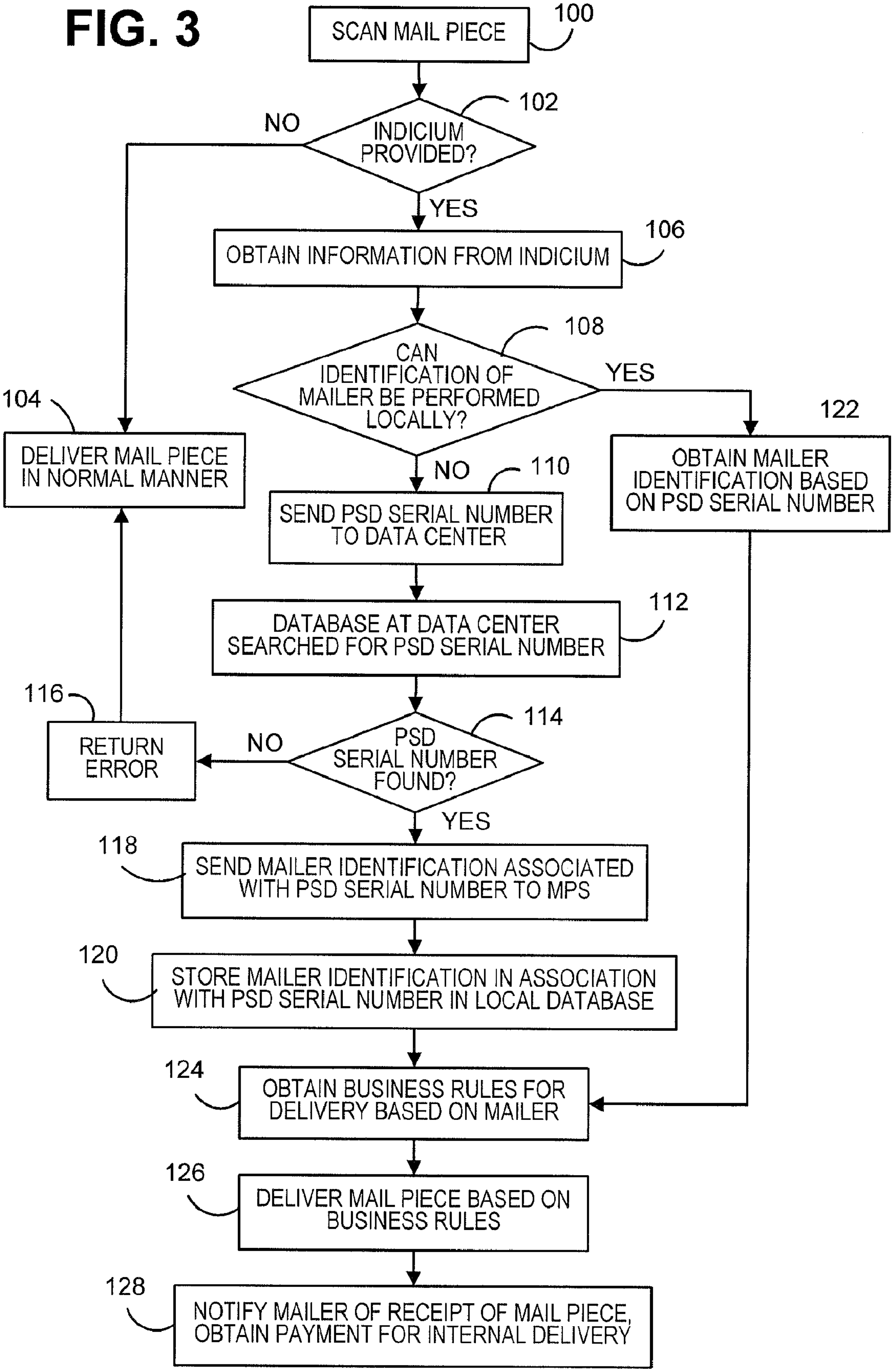
FIG. 3 illustrates in flow chart form an example of the processing performed using the mail processing system when a mail piece is received according to an embodiment.

FIG. 3 illustrates in flow chart form an example of the processing performed during processing of incoming mail pieces according to an embodiment of the invention. The process of FIG. 3 will be described with respect to a single mailer as illustrated in FIG. 1 operating a MPS 30 as illustrated in FIG. 2. It should be understood that such processing will be similar at every mailer location using similar mail processing systems. The processing begins in step 100 where a mail piece received by a mailer, e.g., mailer 12, is fed into the MPS 30 and scanned using the scanner 40 to obtain information provided on the face of the mail piece. Optionally, only those mail pieces that include a meter indicium, i.e., an indicium generated by a metering device, may be fed into the MPS 30, as it is those mail pieces for which authentication of the sender can be positively performed. An example of such an indicium is an information-based indicium as is known in the art. An information-based indicium is an indicium applied to mail to evidence payment of postage in accordance with the Information Based Indicia Program (IBIP) promulgated by the United States Postal Service (USPS). The indicium consists of a two-dimensional bar code and certain human readable information. Requirements for such an indicium can be found in the Information Based Indicia Program (IBIP) Indicium Specification, issued by the USPS on Jun. 13, 1996, the contents of which are incorporated herein by reference.

Removing those mail pieces that do not include a meter indicium before feeding into the MPS 30 would require additional sorting on the part of the operator of the MPS 30, and therefore may not be as desirable. Preferably, all of the received mail pieces would be fed into the MPS 30, and after a mail piece is scanned in step 100, then in step 102 it is determined, using for example, one or more processing routines performed by the CPU 32, if the mail piece includes a meter indicium. This can be performed, for example, by determining if there is a two-dimensional barcode, as required by the Indicium Specification, provided on the mail piece. Optical character recognition or general computer image processing techniques could also be utilized to determine if a meter indicium is provided on the mail piece. If a meter indicium is not provided on a mail piece, then no further processing is performed on the mail piece with respect to the present invention, as it typically would not contain suitable information to be of use, and in step 104 the mail piece is processed according to predefined business rules for delivery of such mail, e.g., delivered to the intended recipient in a normal delivery manner.

If in step 102 it is determined that a mail piece contains a meter indicium, then in step 106 information that is contained within the meter indicium is obtained. As specified in the IBIP Indicium Specification referenced above, both the bar code and human readable information are required to include a device ID/type that represents a unique device identification for the device that generated the indicium. This unique device identification consists of a 3-character vendor identification, a 3-character model number, and an 8-character postal security device (PSD) serial number. The vendor identification relates to the manufacturer of the metering device. Thus, in step 106 the PSD serial number can be obtained either from the two-dimensional barcode or the human-readable portion of the indicium on the mail piece. Optionally, in step 106 other information that may be included in the indicium or provided on the mail piece that uniquely identifies each mail piece could also be obtained, such as, for example, register values, piece count, mail piece identification number, or the like.

In accordance with the present invention, the identity of the mailer (sender) of a mail piece can be determined based on information that uniquely identifies the sender's mail processing system that processed the mail piece for delivery. Such information could include, for example, the serial number of the PSD of the sender's mail processing system that is retrieved from the indicium provided on the mail piece. More specifically, each PSD is licensed to a specific mailer, and as such each PSD is associated with a specific mailer. Thus, knowing the serial number of the PSD that generated an indicium will allow the identity of the specific mailer to which the PSD is licensed for use to be obtained. Because the IBIP indicium includes cryptographic protection in the form of a digital signature, the ability to manipulate or forge such indicium is significantly reduced, thereby providing sufficient assurance that the information contained within the indicium is accurate and can be utilized with confidence. Thus, the identification of the mailer can be determined in a manner that is trustworthy and not easily susceptible to fraudulent manipulation. In step 108, it is determined if identification of the mailer based on the PSD serial number can be performed locally within the MPS 30. This can be performed, for example, by the CPU 32 of MPS 30 searching the database 46 for the PSD serial number. If the MPS 30 has not previously processed a mail piece from the sender as described herein, then the PSD serial number will not be stored in the database 46 and it will not possible to perform the sender identification locally.

In the event the answer in step 108 is no, then in step 110 the MPS 30 sends the PSD serial number obtained from the indicium to the data center 20 via the network 28. Optionally, other information obtained from the indicium can also be sent to the data center 20 in step 110 for use as described below. The data center 20 maintains records of all authorized PSD's that are licensed to mailers in the database 24. In step 112, the control unit 22 of the data center 20, upon receiving the PSD serial number, will search the database 24 maintained at the data center 20 for the PSD serial number. In step 114, it is determined if the PSD serial number is stored in the database 24. If the serial number is not stored in the database 24, then in step 116 an error message is returned to the MPS 30, indicating that the meter indicium was generated by an unknown device, and in step 104 the mail piece is processed in accordance with predefined business rules, e.g., delivered to the intended recipient in a normal delivery manner.

If in step 114 the PSD serial number is found in the database 24, then in step 118 the control unit 22 of the data center 20 sends the identification of the mailer that is associated with the PSD serial number in the database 24 to the MPS 30. Preferably, in step 120, the CPU 32 of the MPS 30 stores the mailer identification in association with the PSD serial number in the local database 46. This will allow the MPS 30 to perform sender identification locally within the MPS 30 for all future mail pieces received from this mailer. Thus, in step 108 if it is determined that identification of the mailer can be performed locally because the PSD serial number is stored in the database 46, then in step 122 the CPU 32 of the MPS 30 can obtain the identification of the mailer based on the PSD serial number.

Once the CPU 32 has obtained an identification of the mailer based on the PSD serial number, whether from the database 46 or from the data center 20, then in step 124 the CPU 32 can retrieve any predetermined business rules for delivery of mail pieces based on the identification of the mailer. Such business rules could be stored, for example, in the database 46 and could include, for example, expedited or special delivery to the intended recipient, delivery without opening or removing contents of the mail piece, delivery without screening for hazardous substances, contraband, or the like, delivery to a special internal recipient regardless of the name on the recipient name on the mail piece, or any other special rules that will be followed when a mail piece is from a specific mailer. Alternatively, the CPU 32 of the recipient's MPS 30 can communicate with the CPU 32 of the mailer's MPS 30, via the network 28, and the CPU 32 of the mailer's MPS 30 can transmit one or more desired business rules for delivery of the mail piece. In this manner, different mail pieces from the same mailer can be subject to different business rules for delivery as desired by the mailer.

Optionally, in step 124, the mail piece could be marked, using, for example, the printer 38 of the MPS 30, to indicate the type of delivery for the mail piece. In step 126, the mail piece is delivered utilizing the business rules obtained in step 124. Optionally, in step 128, notification of receipt of the mail piece, using the other information obtained from the mail piece (step 106) that uniquely identifies each mail piece, could be sent to the mailer. This notification can be performed, for example, using the recipient's MPS 30 via the network 28. Such notification can be sent via the data center 20 or directly to the mailer's MPS 30. In addition, some mailers and recipients may have established a relationship whereby the recipient will utilize certain business rules for internal delivery of mail received from a mailer in exchange for payments from the mailer. For example, a recipient may expedite internal delivery of certain mail pieces, or provide notification of receipt in exchange for payment from the mailer. Thus, in step 128, the recipient can also optionally receive payment from the mailer for delivering the mail piece utilizing the previously agreed upon business rules. Such payment can occur directly between the MPS 30 of the recipient and the MPS 30 of the mailer (by updating the registers maintained in the postage metering devices 42).

In situations where a single PSD is shared by multiple mailers, such as, for example, a shared mailroom environment or mail house environment, knowledge of just the PSD serial number would not be sufficient to identify the specific mailer, as it would not be known based solely on the PSD serial number which mailer the mail piece is actually from. The PSD would be licensed to only a single party, e.g., the mail house or only operator of a shared mailroom. In such shared situations, therefore, it is necessary to be able to individually identify each mail piece such that it can be traced back to a specific mailer, and not just the mail house or shared mailroom. Shared systems typically employ departmental accounting features whereby the system accounts for postage usage by different users providing that the system has information about the identity of such users. These departmental accounting features can be adapted to identify the sender responsible for an individual mail item. This can be performed by associating information that uniquely identifies each mail piece with the specific mailer from which the mail piece is being sent and storing such association in a record for later use. Thus, each mail piece will be linked with a specific mailer based on the information that uniquely identifies each mail piece. For example, when a mail piece is being prepared for sending using a shared mailroom or at a mail house, the value when the mail piece is processed of the ascending register (AR) maintained in the PSD can be associated with the specific mailer and stored in a record maintained by the shared MPS 30. Alternatively, such records could be uploaded to the data center 20 for storage in the database 24. Since the AR value will be unique for each mail piece prepared by a specific PSD, knowledge of the AR value (obtained from the indicium), in conjunction with the record associating each AR value with a specific mailer, will enable the specific mailer to be identified. Alternatively, other unique identifiers that are applied to each mail piece could also be utilized, such as, for example, an Intelligent Mail Barcode, confirmation barcodes, unique identification numbers assigned to each mail piece, or any other type of identification system capable of uniquely identifying each mail piece that is processed by the same PSD.

Figure 4:
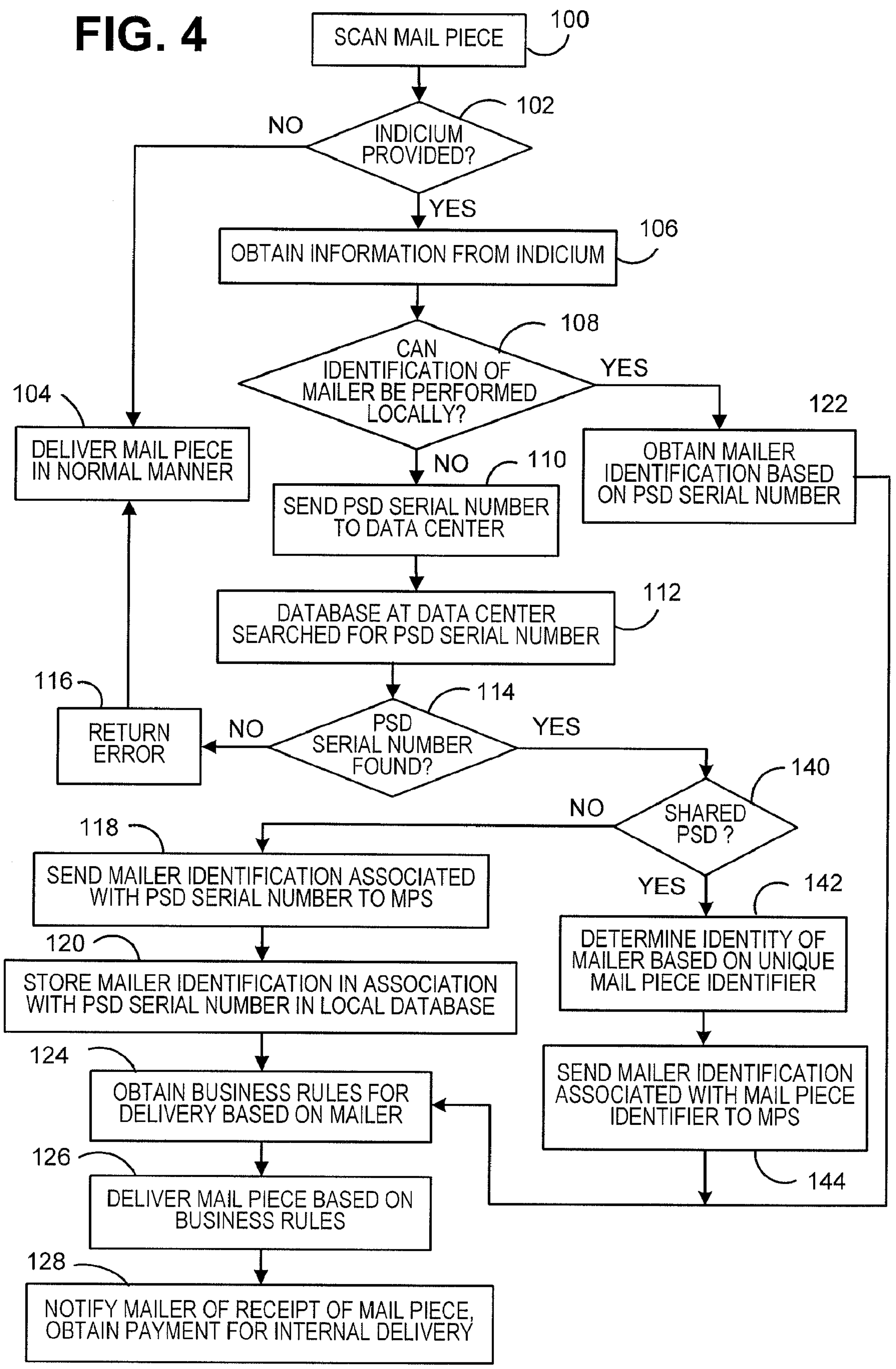
FIG. 4 illustrates in flow chart form an example of the processing performed using the mail processing system when a mail piece is received according to another embodiment.

FIG. 4 illustrates in flow chart form an example of the processing performed during processing of incoming mail pieces according to an embodiment of the invention in which the identification of a mailer can be determined in a shared PSD environment. FIG. 4 is similar to FIG. 3, and like reference numerals refer to like items, the description of which is provided above with respect to FIG. 3 and which will not be repeated here. The differences between FIG. 3 and FIG. 4 are as follows. In step 114, if it is determined that the PSD serial number is found in the database 24, then in step 140 it is determined if the PSD is a shared PSD. This can be determined by the control unit 22 searching the database 24 for records indicating that a PSD is shared by multiple mailers (such records being provided when the mail piece is being prepared as described above). If the PSD is not a shared PSD, then processing proceeds with step 118 as described above with respect to FIG. 3. If it is determined that the PSD is a shared PSD, then in step 142 the control unit will determine the identity of the mailer utilizing the other information, e.g., AR value, unique mail piece identifier, etc., provided with the PSD serial number (in step 110) and the records maintained in the database 24.

In step 144, the mailer identification that is associated with the mail piece is sent to the MPS 30. Processing then proceeds to step 124 as described above with respect to FIG. 3. As an alternative to the data center 20 maintaining records that associates each mail piece with a specific mailer, the MPS 30 of the recipient could instead directly communicate with the MPS 30 that was used to generate the indicium on the mail piece to determine the specific mailer for the mail piece. For example, the data center 20 could provide the mailer identification (shared MPS 30) based solely on the PSD serial number, and the MPS 30 of the recipient could communicate with the shared MPS 30 to provide the other information obtained from the mail piece that identifies the mail piece. The shared MPS 30 can then search its internal records for the identity of the specific mailer associated with that mail piece, and provide it to the recipient's MPS 30.

Thus, according to the present invention, systems and methods for authenticating the mailer of a mail piece in a manner that is trustworthy and not easily susceptible to fraudulent manipulation are provided. A mail processing system is utilized by recipients of mail pieces to scan each incoming mail piece. For those incoming mail pieces that are provided with a meter generated indicium that evidences payment of postage, the mail processing system obtains information from the indicium on each mail piece. Such information could include, for example, an identification of the postage meter that was used to generate the indicium, as well as information that uniquely identifies a mail piece. Based on the identification of the postage meter and other information, the recipient's mail processing system can obtain an identification of the mailer of the mail piece. Once the identification of the mailer is authenticated based on this information, the recipient can utilize one or more business rules for internal delivery of the mail piece.

While preferred embodiments of the invention have been described and illustrated above, it should be understood that they are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for a recipient of a mail piece sent by a mailer to process the mail piece using a first mail processing system, the method comprising:

scanning, using a scanning device of the first mail processing system, the mail piece to obtain information provided on the mail piece, the information including information that uniquely identifies a second mail processing system used to prepare the mail piece for delivery to the recipient;

determining, by a processing device of the first mail processing system, an identification of the mailer of the mail piece based on the information that uniquely identifies the second mail processing system used to prepare the mail piece for delivery to the recipient;

obtaining, by the first mail processing system, business rules for delivery internal to the recipient of the mail piece based on the identification of the mailer; and receiving, by the first mail processing system, payment from the mailer for delivery of the mail piece internal to the recipient based on the obtained business rules, the payment including a transfer of funds from a register maintained in the second mail processing system to a register maintained in the first mail processing system.

2. The method of claim 1, wherein the information that uniquely identifies the second mail processing system includes a serial number of a metering device of the second mail processing system that was used to generate an indicium for the mail piece.

3. The method of claim 2, wherein the first mail processing system maintains a database that stores serial numbers of metering devices in association with an identification of a specific mailer, and determining the identification of the mailer further comprises:

searching the database for the serial number of the metering device used to generate the indicium provided on the received mail piece; and determining the identification of the mailer of the received mail piece to be the specific mailer associated with the serial number of the metering device.

4. The method of claim 2, wherein determining the identification of the mailer further comprises:

sending the serial number of the metering device used to generated the indicium provided on the mail piece to a remote data center; and receiving from the remote data center the identification of the mailer based on the serial number of the metering device.

5. The method of claim 4, further comprising:

storing in a database maintained at the first mail processing system the serial number of the metering device in association with the identification of the mailer.

6. The method of claim 1, further comprising:

providing notification to the mailer of receipt of the mail piece.

7. The method of claim 1, wherein obtaining business rules further comprises:

obtaining business rules that are stored in a memory of the first mail processing system.

8. The method of claim 1, wherein obtaining business rules further comprises:

receiving the business rules from the second mail processing system.

9. The method of claim 1, wherein the information that uniquely identifies the second mail processing system includes a serial number of a metering device of the second mail processing system that was used to generate an indicium for the mail piece and a register value of the metering device.

10. The method of claim 1, wherein the information obtained from the mail piece further includes a unique identifier applied to the mail piece, and determining an identification of the mailer of the mail piece further comprises:

determining an identification of the mailer of the mail piece based on the information that uniquely identifies the second mail processing system and the unique identifier applied to the mail piece.

11. A system for a recipient to process a received mail piece, the system comprising:

a scanning device to scan the received mail piece and obtain information provided on the received mail piece, the information including information that uniquely identifies a mail processing system used to prepare the mail piece for delivery;

a processing device configured to determine, an identification of a mailer of the received mail piece based on the information that uniquely identifies the mail processing system used to prepare the mail piece for delivery;

means for obtaining business rules for delivery internal to the recipient of the mail piece based on the identification of the mailer; and means for receiving payment from the mailer for delivery of the mail piece internal to the recipient based on the obtained business rules, the payment being transferred from a register maintained in the mail processing system used to prepare the mail piece for delivery to a register maintained by the system for processing the received mail piece.

12. The system of claim 11, wherein the information that uniquely identifies the mail processing system includes a serial number of a metering device of the mail processing system that was used to generated an indicium for the mail piece.

13. The system of claim 12, further comprising:

a database that stores serial numbers of metering devices in association with an identification of a specific mailer; and means for searching the database for the serial number of the metering device used to generate the indicium provided on the received mail piece, wherein the identification of the mailer of the received mail piece is determined to be the specific mailer associated with the serial number of the metering device.

14. The system of claim 12, further comprising:

means for sending the serial number of the metering device used to generate, the indicium provided on the mail piece to a remote data center; and means for receiving from the remote data center the identification of the mailer based on the serial number of the metering device.

15. The system of claim 14, further comprising:

a database maintained at the mail processing system; and means for storing in the database the serial number of the metering device in association with the identification of the mailer.

16. The system of claim 11, further comprising:

means for providing notification to the mailer of receipt of the mail piece.

17. The system of claim 11, wherein the information that uniquely identifies the mail processing system used to prepare the mail piece for delivery includes a serial number of a metering device of the mail processing system that was used to generate an indicium for the mail piece and a register value of the metering device.

18. The system of claim 11, wherein the information obtained from the mail piece further includes a unique identifier applied to the mail piece, and the means for determining an identification of the mailer of the mail piece further comprises:

means for determining an identification of the mailer of the mail piece based on the information that uniquely identifies the mail processing system used to prepare the mail piece for delivery and the unique identifier applied to the mail piece.

* * * * *